United States Patent
Hughes et al.

(10) Patent No.: US 9,031,904 B2
(45) Date of Patent: *May 12, 2015

(54) PORTABLE APPLICATION REGISTRY

(75) Inventors: Aidan T. Hughes, Bellevue, WA (US); David Yalovsky, Seattle, WA (US); Anzhelika Y. Nishanova, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/031,090

(22) Filed: Feb. 18, 2011

(65) Prior Publication Data

US 2011/0145281 A1    Jun. 16, 2011

Related U.S. Application Data

(63) Continuation of application No. 11/275,136, filed on Dec. 13, 2005, now Pat. No. 7,917,487.

(51) Int. Cl.
*G06F 7/00*      (2006.01)
*G06F 17/00*     (2006.01)
*G06F 9/445*     (2006.01)

(52) U.S. Cl.
CPC ........ *G06F 9/44505* (2013.01); *G06F 9/44584* (2013.01); *Y10S 707/99954* (2013.01)

(58) Field of Classification Search
CPC ............................ G06F 9/4411; G06F 9/44505
See application file for complete search history.

(56) References Cited

U.S. PATENT DOCUMENTS

| 5,684,990 | A | * | 11/1997 | Boothby ............................... 1/1 |
| 5,845,128 | A | | 12/1998 | Noble et al. |
| 6,216,158 | B1 | * | 4/2001 | Luo et al. ....................... 709/217 |
| 6,324,590 | B1 | | 11/2001 | Jeffords et al. |
| 6,343,287 | B1 | | 1/2002 | Kumar et al. |
| 6,374,402 | B1 | | 4/2002 | Schmeidler et al. |
| 6,442,570 | B1 | | 8/2002 | Wu |

(Continued)

FOREIGN PATENT DOCUMENTS

| JP | 2002041247 | 2/2002 |
| JP | 2002051058 | 2/2002 |

(Continued)

OTHER PUBLICATIONS

Translated the Japanese Office Action mailed Nov. 18, 2011 for Japanese patent application No. 2005-344185, a counterpart foreign application of US patent No. 7,712,086, 15 pages.

(Continued)

*Primary Examiner* — Hosain Alam
*Assistant Examiner* — Azam Cheema
(74) *Attorney, Agent, or Firm* — Steve Crocker; Jim Ross; Micky Minhas

(57) ABSTRACT

This document describes techniques that enable an application to operate as if the application were running on its native computing system when it is actually running on another computing system. The techniques may do so by building a portable database having metadata particular to the application, which can be stored in a portable device along with that application. When that portable device is connected to another computing system, the portable database may be used to supplement or supplant the other computing system's database to enable the application to operate with its particular functionality.

20 Claims, 6 Drawing Sheets

(56) References Cited

U.S. PATENT DOCUMENTS

| | | | |
|---|---|---|---|
| 6,738,766 B2 | 5/2004 | Peng | |
| 6,813,344 B1* | 11/2004 | Lemke | 379/142.06 |
| 6,850,986 B1 | 2/2005 | Peacock | |
| 6,868,451 B1* | 3/2005 | Peacock | 709/231 |
| 6,895,401 B2 | 5/2005 | Skinner et al. | |
| 6,918,113 B2 | 7/2005 | Patel et al. | |
| 7,013,313 B1 | 3/2006 | LaRue | |
| 7,080,279 B2 | 7/2006 | Asare et al. | |
| 7,197,234 B1 | 3/2007 | Chatterton | |
| 7,367,063 B1* | 4/2008 | O'Toole, Jr. | 726/34 |
| 7,653,777 B2* | 1/2010 | Tan et al. | 711/103 |
| 2002/0085579 A1* | 7/2002 | Sullivan et al. | 370/428 |
| 2003/0023661 A1 | 1/2003 | Clohessy et al. | |
| 2004/0083473 A1 | 4/2004 | Thomas et al. | |
| 2004/0172427 A1 | 9/2004 | Thomas et al. | |
| 2004/0215700 A1 | 10/2004 | Shenfield et al. | |
| 2005/0006461 A1 | 1/2005 | Shenker et al. | |
| 2005/0021571 A1 | 1/2005 | East | |
| 2005/0038773 A1 | 2/2005 | Gray et al. | |
| 2005/0050084 A1 | 3/2005 | Atm | |
| 2005/0066073 A1 | 3/2005 | Jacobs et al. | |
| 2005/0071378 A1 | 3/2005 | Smith | |
| 2005/0083741 A1 | 4/2005 | Chang et al. | |
| 2005/0114300 A1 | 5/2005 | Khalid et al. | |
| 2005/0169073 A1 | 8/2005 | Cook et al. | |
| 2005/0210501 A1* | 9/2005 | Zigmond et al. | 725/32 |
| 2005/0240918 A1* | 10/2005 | Shlomai | 717/162 |
| 2005/0274798 A1* | 12/2005 | Bacastow | 235/383 |
| 2006/0026414 A1 | 2/2006 | Firebaugh et al. | |
| 2006/0130004 A1 | 6/2006 | Hughes et al. | |
| 2006/0190580 A1 | 8/2006 | Shu et al. | |
| 2006/0218549 A1 | 9/2006 | Hsu et al. | |
| 2007/0016695 A1* | 1/2007 | Rabbers et al. | 709/248 |

FOREIGN PATENT DOCUMENTS

| | | |
|---|---|---|
| JP | 2003108385 | 4/2003 |
| JP | 2003178017 | 6/2003 |
| JP | 2003535414 | 11/2003 |
| JP | 2004151785 | 5/2004 |
| JP | 2004206660 | 7/2004 |
| JP | 2004234668 | 8/2004 |
| WO | WO0029945 A | 5/2000 |
| WO | WO2004093149 A | 10/2004 |

OTHER PUBLICATIONS

The Korean Office Action mailed Jan. 26, 2012 for Korean patent application No. 10-2005-101217, a counterpart foreign application of US patent No. 7,712,086, 3 pages.

Masui, "Street corner of interface, 72, application of the state notification system," UNIX Magazine, vol. 19, No. 2, ASCII Corporation, Feb. 1, 2004, 8 pages.

"Software directly usable from USB connection memory solves your problem", ASCII.PC, vol. 6, No. 11, p. 23, ASCII Corporation, Nov. 1, 2003, 6 pages.

"Special plan, unbeatable hacker's tool 2002, Part 2, fully using mail software which is convenient for the management of e-mail", PC Japan, vol. 7, No. 7, pp. 100-105, Softbank Publishing Inc., Jul. 1, 2002, 11 pages.

"Special topic 1, knockout tool integration technique, ultra speedy remote download by the DL command by mail," Net Runner, vol. 6, No. 8, pp. 48-51, Softbank Publishing Inc., Aug. 1, 2004, 9 pages.

Toyota, "keystone of COM, let's meet interface," Nikkei Software, vol. 3, No. 3, pp. 91-100, Nikkei Business Publications, Inc., Feb. 24, 2000, 15 pages.

The Japanese Office Action mailed Aug. 3, 2012 for Japanese patent application No. 2005-344185, a counterpart foreign application of US patent No. 7,712,086, 28 pages.

Translated the Japanese Office Action mailed Nov. 30, 2012 for Japanese patent application No. 2005-344185, a counterpart foreign application of US patent No. 7,712,086, 15 pages.

The European Office Action mailed Oct. 27, 2014 for European patent application No. 05111222.5, a counterpart foreign application of U.S. Appl. No. 11/012,926, 4 pages.

"Application Virtualization Technology", Retrieved from the Internet Oct. 17, 2005 at <<http://www.softricity.com/products/virtualization.asp>>, 3 pages.

"Citrix Presentation Server 4.0—Application Isolation Environments", Retrieved from the Internet at <<http://demo.asiasoft.com.hk/citrix/Section2/v4.0/Whitepapers/PS4.0_Application_Isolation.pdf>>, (c) 2005, Citrix Systems, Inc., 6 pages.

"Curtailing the Piracy Epidemic: A Case for Hardware Security Keys", Rainbow Technologies, Jun. 17, 2002, pp. 1-7.

Diego, "Iomega Launches New Mini USB Drive * * * * Key-Sized Drive Debuts at Comdex Fall 2002 Show in Las Vegas", Nov. 10, 2004, pp. 4.

Ellison, "Feature-Rich Flash Drives, Part I", Mar. 18, 2004, 5 pages.

Office Action from the U. S. Patent and Trademark Office for U.S. Appl. No. 11/012,926, mailed Aug. 26, 2009, 17 pages.

Office Action from the U. S. Patent and Trademark Office for U.S. Appl. No. 11/012,926, mailed Oct. 15, 2008, 21 pages.

Office Action from the U. S. Patent and Trademark Office for U.S. Appl. No. 11/012,926, mailed Feb. 20, 2008, 21 pages.

Office Action from the U. S. Patent and Trademark Office for U.S. Appl. No. 11/012,926, mailed Mar. 5, 2009, 13 pages.

Notice of Allowance from the Patent Office of the State Intellectual Property office of the People's Republic of China App. No. 200510125030.6, mailed on Oct. 26, 2010, 6 pages.

Notice of Allowance from the U.S. Patent and Trademark Office for U.S. Appl. No. 11/012,926, mailed Dec. 15, 2009, 13 pages.

Office Action from the Patent Office of the State Intellectual Property office of the People's Republic of China App. No. 200510125030.6, mailed on Mar. 20, 2009, 9 pages.

Office Action from the Patent Office of the State Intellectual Property office of the People's Republic of China App. No. 200510125030.6, mailed on Sep. 28, 2008, 35 pages.

Office Action from European Patent Office for Application No. 05111222.5, mailed Jul. 17, 2008, 3 pages.

"Protect Your Software and Increase Your Revenues", Sentinel SuperPro, Nov. 2, 2004, 2 pages.

"Radia (Walls) Information", Retrieved from the Internet on Oct. 17, 2005 at <<http://www.oit.gatech.edu/software/radia/overview.cfm>>, 6 pages.

"Registry Redirector", Retrieved from the Internet on Oct. 17, 2005 at <<http://msdn.microsoft.com/library/default.asp?url=/library/en-us/win64/win64/registry_redirector.asp>>, 2 pages.

"RunScanner PlugIn", Retrieved from the Internet on Oct. 17, 2005 at <<http://www.paraglidernc.com/RunScanner.html>>, 4 pages.

"Sofware Virtualization Solution", Retrieved from the Internet on Oct. 17, 2005 at <<http://www.altiris.com/docs/products/DS-SVS.pdf>>.

"DiskOnKey Pro", retrieved on Nov. 10, 2004 at <<http://www.diskonkey.com/applications.asp>>, DiskOnKey, pp. 2.

Indian Office Action mailed Mar. 31, 2015 for Indian patent application No. 2947/DEL/2005, a counterpart foreign application of U.S. Appl. No. 11/012,926, 3 pages.

* cited by examiner

PORTABLE APPLICATION REGISTRY

RELATED APPLICATION

This application is a continuation of U.S. patent application Ser. No. 11/275,136, filed on Dec. 13, 2005, which is incorporated by reference herein in its entirety.

BACKGROUND

Software applications often behave in particular ways based on changes made when using that application, such as changes made by a user setting his or her preferences, and/or metadata about an application, such as metadata providing components of the application with a roadmap to other components. A user may, for instance, customize toolbars for his spreadsheet application or a dictionary for his word-processing application's spell checker.

Customizations and other application-specific functionality are generally retained by the application's native computing system—not the application itself. When an application is executed, it interacts with its native computing system's registry to enable its particular functionality.

When an application is saved to a portable device and connected to another computing system, however, the application may behave differently. It can behave differently because the other computing system's registry may not have a record of the application's particular functionality. The afore-mentioned user's spreadsheet application, for example, may have different toolbars or his dictionary not recognize particular words previously added by the user.

SUMMARY

This document describes techniques that enable an application to operate as if the application were running on its native computing system when it is actually running on another computing system. The techniques may do so by building a portable registry having metadata particular to the application, which can be stored in a portable device along with that application. When that portable device is connected to another computing system, the portable registry may be used to supplement or supplant the other computing system's registry to enable the application to operate with its particular functionality.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes many techniques, some of which enable a portable application to operate on a computing system with functionality associated with the application. These techniques may do so using a portable registry capable of supplementing or supplanting the computing system's registry.

For example, these techniques may enable a user to operate his portable spreadsheet application on a new computing system and use his particular toolbars, or operate his portable word-processing application and spell check words that he previously added to his dictionary.

An environment in which these and other techniques may operate is set forth first below. This is followed by a section entitled Operating on a Computing System, which describes exemplary ways in which a portable application may operate on a computing system using a portable registry.

Exemplary Operating Environment

Before describing the techniques in detail, the following discussion of an exemplary operating environment is provided to assist the reader in understanding one way in which various inventive aspects of the techniques may be employed. The environment described below constitutes but one example and is not intended to limit application of the techniques to any one particular operating environment. Other environments may be used without departing from the spirit and scope of the claimed subject matter.

Figure 1:
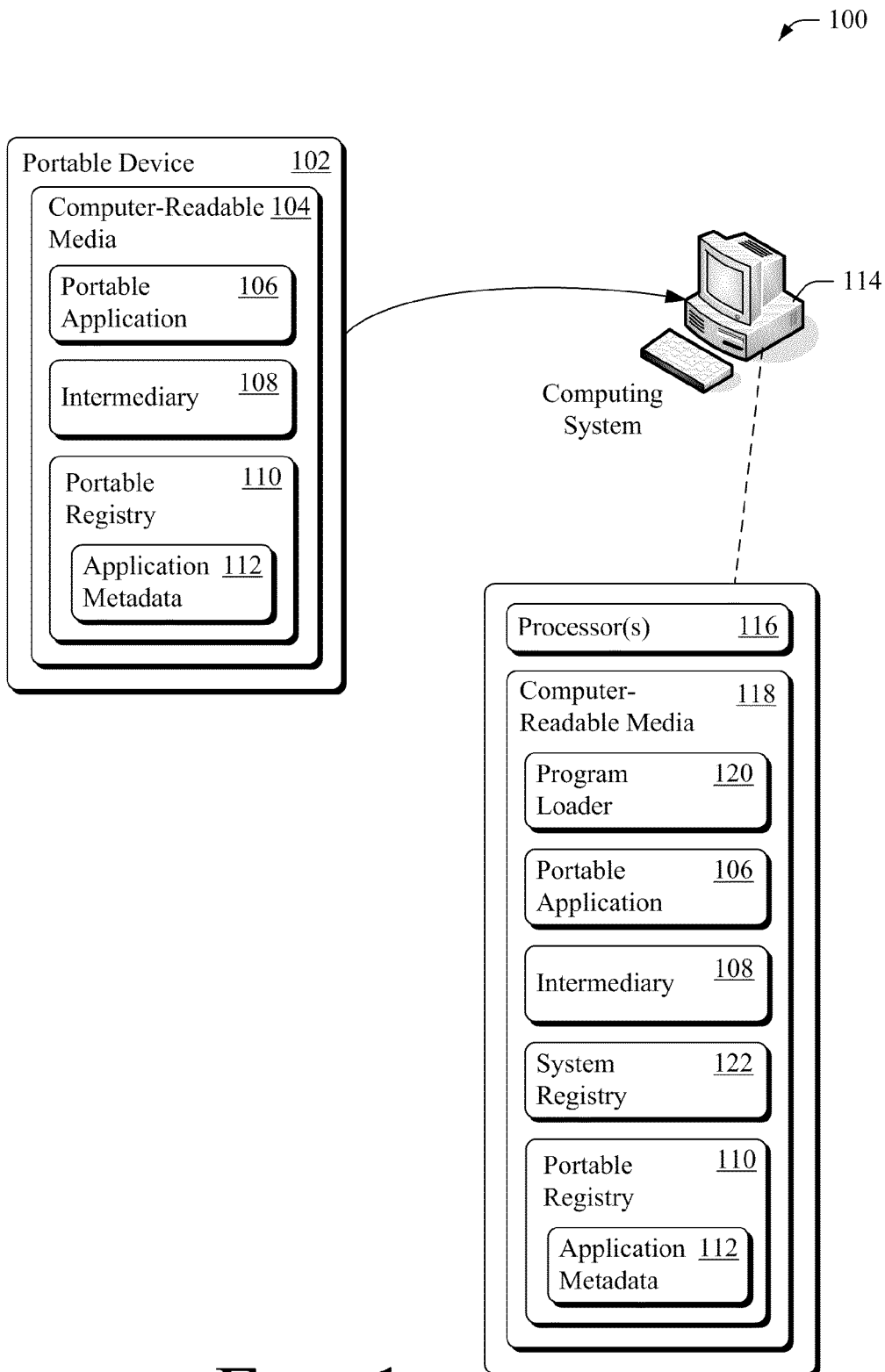
FIG. 1 illustrates an exemplary operating environment in which various embodiments can operate.

FIG. 1 illustrates one such operating environment generally at 100 comprising a portable device 102, such as a thumb drive, portable hard drive, compact disc, or other storage device. The portable device comprises computer-readable media 104 having a portable application 106, an intermediary 108, and/or a portable registry 110.

The portable registry may comprise application metadata 112, which may be used by the portable application or an operating system to enable the portable application's particular functionalities and behavior. The application metadata may include information affecting how the portable application behaves, such as how particular functionalities act or are presented (e.g., a toolbar's appearance). For example, the metadata may indicate which interfaces to expose to the portable application and a start menu, icons, or graphics that the portable application uses.

Here the portable storage device stores these elements for later use by a computing system 114. Computing system 114 may initially lack some or all of the application metadata such that the portable application may not perform and behave on the computing system as it should. The computing system comprises one or more processor(s) 116 and computer-readable media 118. The system's processor(s) are capable of accessing and/or executing the media. The media, initially or eventually, comprises or has access to a program loader 120, portable application 106, intermediary 108, a system registry 122, portable registry 110, and application metadata 112. The portable application, the intermediary, the portable registry, and the application metadata may be received from the portable device.

Operating on a Computing System

The following discussion describes exemplary ways in which an application may operate on a computing system using a portable registry.

Figure 2:
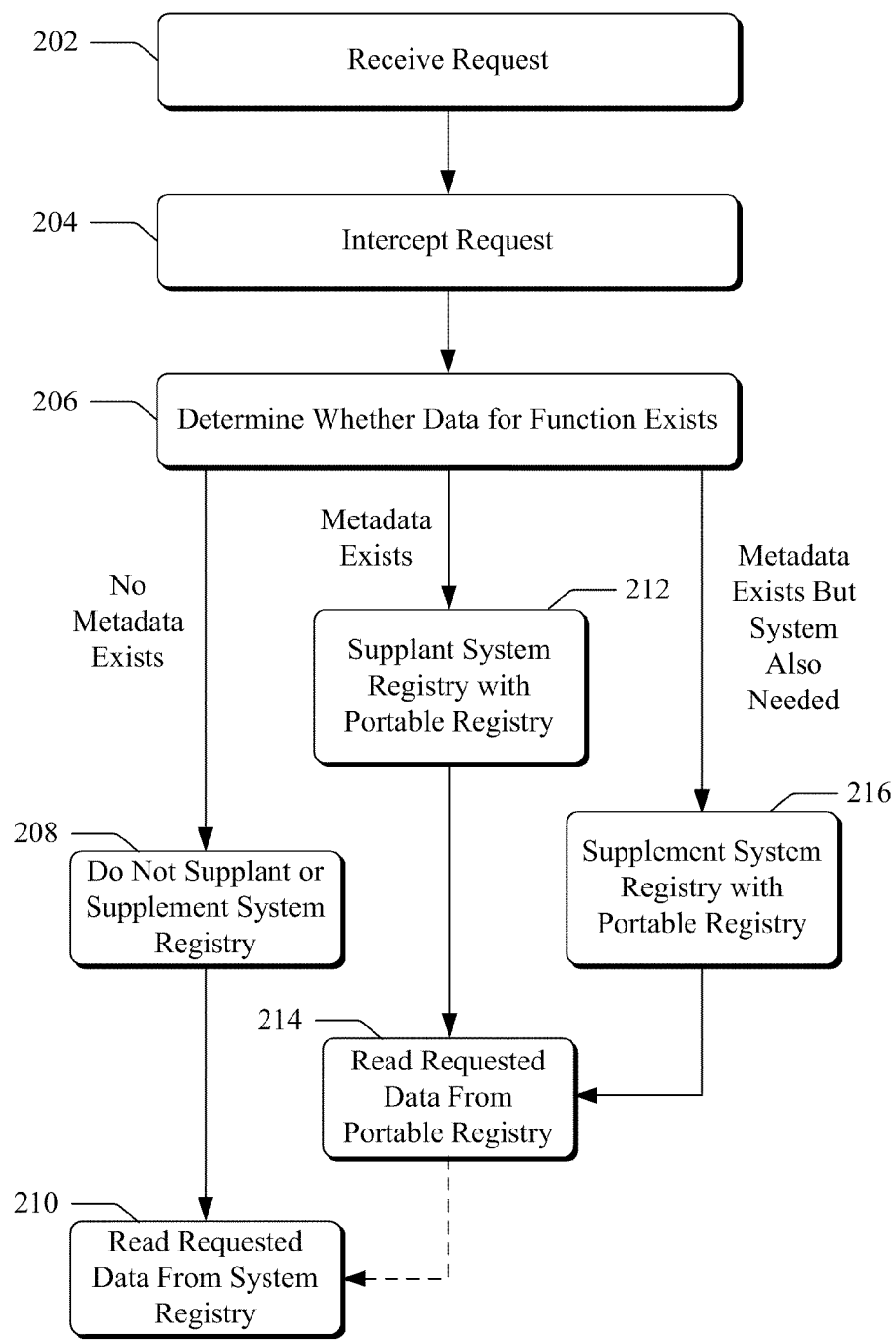
FIG. 2 is an exemplary process for using a portable registry to supplement or supplant a computing system's registry.

FIG. 2 is an exemplary process 200 for using a portable registry to supplement or supplant a computing system's registry to enable the application to operate with its particular functionality. It is illustrated as a series of blocks representing individual operations or acts performed by elements of operating environment 100 of FIG. 1, such as portable application 106 and intermediary 108. This process may be implemented in any suitable hardware, software, firmware, or combination thereof; in the case of software and firmware, it represents a set of operations implemented as computer-executable instructions stored in computer-readable media and executable by one or more processors.

Block 202 receives a request for a function or data usable by a portable application. This request may be accessed through a system registry that, were it made to the portable registry, could enable functionality particular to the application.

The portable application's particular functionality may be affected by its own requests or requests from another entity. For example, block 202 may receive the request for a function from the portable application or a module associated with or usable by the portable application. If, for instance, the portable application causes additional library modules to be loaded, which may also request functions affecting the portable application's particular functionality, the module's requested functions may be handled similarly to those from the portable application itself.

Here the request is from portable application 106 and intended for system registry 122.

Block 204 intercepts the request, such as by intermediary 108. The techniques may, in cases where the intermediary is not part of the portable application, enable the portable application and its associated modules to remain unaltered while still enabling the portable application's particular functionality. Block 204 may do so by acting on a request that does not need to be altered or come from a requesting entity that needs to be altered.

In some other cases the intermediary is part of the portable application. In these cases the intermediary intercepts the request to preclude the portable application from requesting a function or data directly from the system registry.

Figure 3:
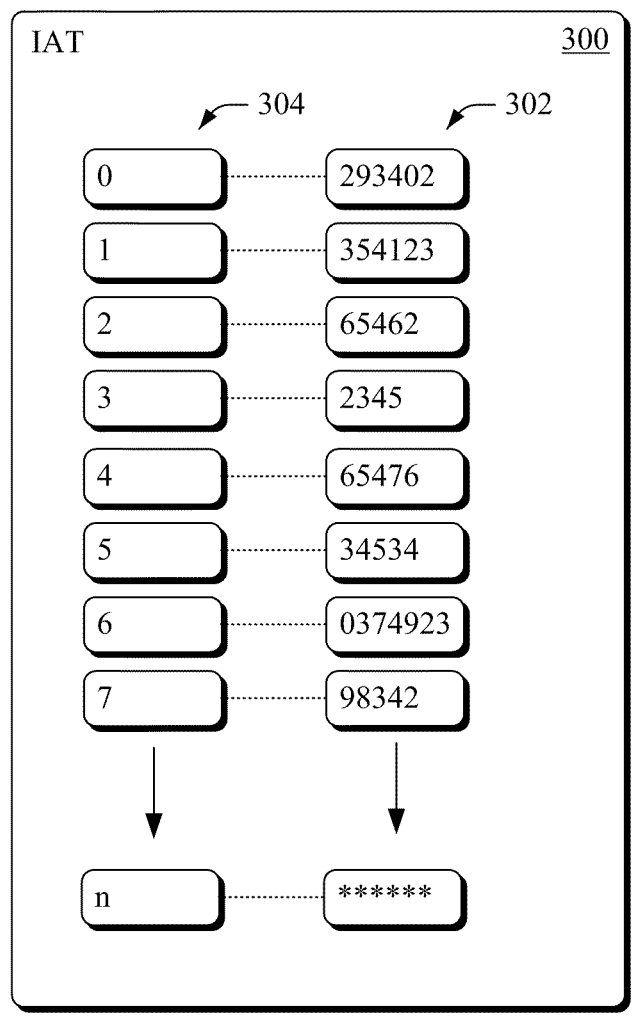
FIG. 3 illustrates an unaltered, exemplary simplified import address table.

The intermediary may intercept the request by first altering a table of addresses, such as an exemplary, simplified Import Address Table (IAT) 300 in FIG. 3. This IAT is built by the program loader. It provides addresses by which the portable application, when it is executing, may request (directly or indirectly through other modules) data for a particular function. These requests may include opening a registry key, reading or writing a value (one or more times), and closing the registry key.

The program loader populates the IAT with a location. This permits the portable application to call the address in the IAT, which may simply be an integer related to data or a function's memory location (also in the IAT), rather than a particular path. The IAT comprises actual and original addresses, shown at 302. It also comprises IAT addresses 304 associated with these actual addresses. An application may call the IAT address instead of the actual address.

This IAT may, however, be built or altered to permit requesting a function enabled by intermediary 108.

Here the intermediary replaces the original function addresses in the IAT prior to the request, so that, when the portable application first requests a particular IAT address 304, the function associated with that IAT address prompts the intermediary to execute. The intermediary may replace the original function addresses prior to any original function being called by replacing the original function addresses in the IAT very early in the execution of the portable application (e.g., by the portable application calling the intermediary first).

Figure 4:
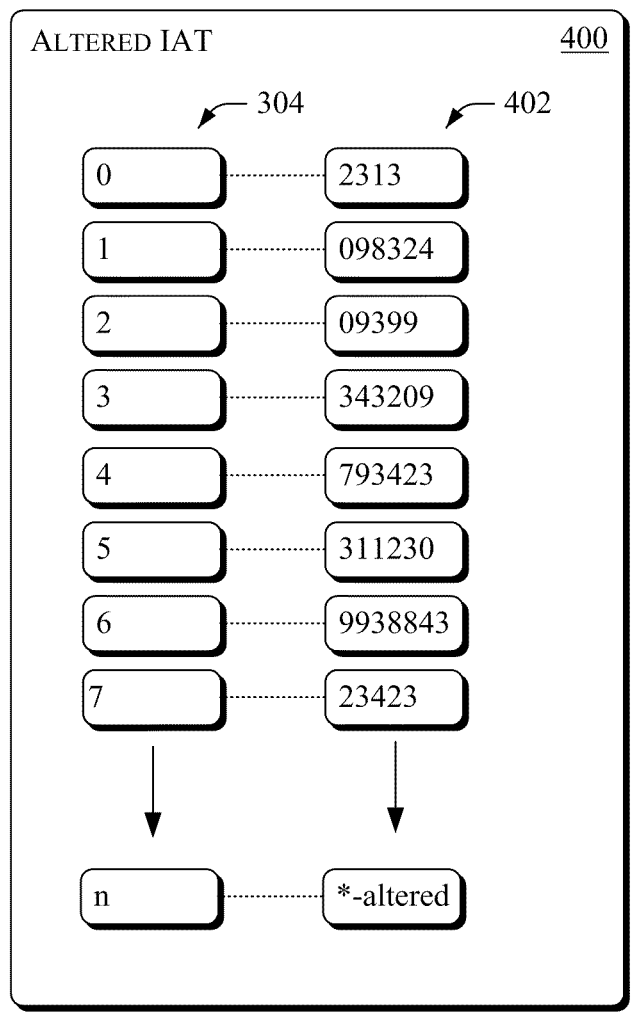
FIG. 4 is the import address table of FIG. 3 after alteration to the functions' original addresses.

FIG. 4, for example, shows an exemplary altered IAT 400. Here the same IAT addresses 304 are shown, but addresses for intermediary functions 402 are shown instead of the original function addresses 302.

Block 206 determines whether registry data exists to enable functionality particular to an application that is being operated from a portable device on a computing system having a system registry. In some cases application-specific metadata related to the requested function is in the portable registry. In some others, no application-specific metadata is so related. In still others, such as when the requested function repeats to enumerate a complete set of values, application-specific metadata related to the requested function may be in the portable registry but metadata in the system registry may also be related to the requested function.

If block 206 determines that the requested registry data does not have associated metadata related to the portable application (e.g., if the requested data does not exist in the portable registry), it proceeds to block 208. Block 208 does not supplant or supplement the system registry. Here block 208 proceeds to block 210, which reads the requested data from the system registry.

If block 206 determines that the registry data requested has associated metadata related to the portable application and in some cases also that the system registry is not needed, it proceeds to block 212. Block 212 supplants the system registry with the portable registry or its metadata. The intermediary may supplant the system registry by routing a request for data to the portable registry instead of the system registry.

It then proceeds to block 214, which reads the requested data from portable registry. Here the techniques seamlessly integrate metadata associated with particular functionality of the portable application with a system registry such that the portable application retains its particular functionality.

If block 206 determines that the requested registry data has associated metadata related to the portable application and also needs the registry data to be requested from the system registry, it proceeds to block 216. Block 216 supplements the system registry with the portable registry and proceeds to block 214. Block 214 reads the requested registry data from the portable registry. After block 214, however, the process proceeds to block 210 to also read requested data from the system registry. This supplementing of the system registry may occur when multiple iterations of a function are needed, such as to enumerate multiple values.

When the IAT address 304 is called, the intermediary function is instead executed, thereby intercepting execution of the intended function at address 302 and instead executing the intermediary function at the associated address 402.

When executed, the intermediary function first attempts to open a key in the portable registry. The portable registry contains keys and values, with the keys organized hierarchically. Keys may contain other keys or values. The intermediary may also read or write data from or to the portable or system registries. The intermediary function may also close a key.

IAT 300 contains a list of references to Application Programming Interfaces (APIs), which are designed to act on the system registry. These APIs may be intercepted by the intermediary (shown in FIG. 5 using altered IAT 400), which on a case-by-case basis, decides from which registry (portable or system) to read. This decision may be made based on the name of the key or key handle ("HKEY") provided by the requesting entity. Thus, a given API may read the portable registry for one HKEY and the system registry for a different HKEY.

Figure 5:
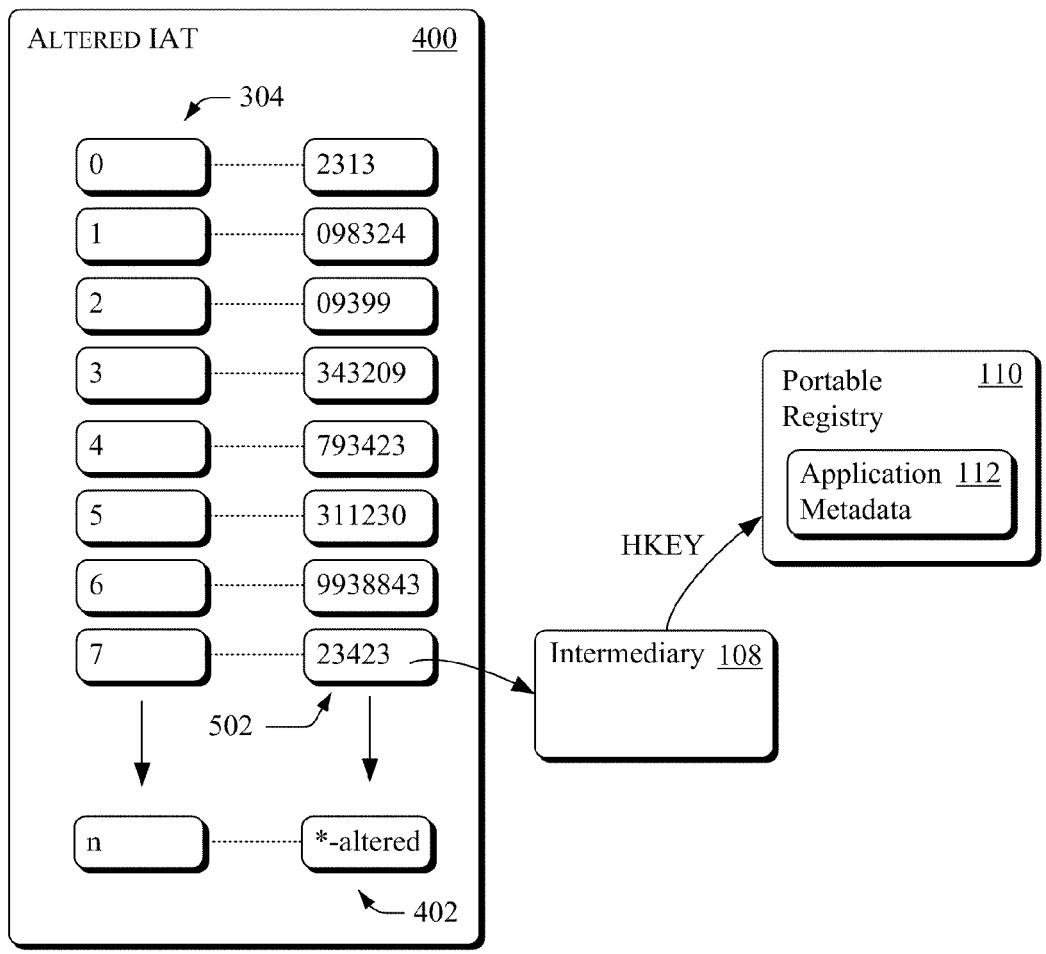
FIG. 5 illustrates an intermediary attempting to call a function through an exemplary portable registry.

FIG. 5 illustrates application code attempting to call a function addressed at 502, which is intercepted by the intermediary 108. The requested key is provided through an exemplary portable registry 110 using an HKEY. If that key is available (and thus has portable application metadata associated with it), the requested data is read from the portable registry.

If the requested key is not available (e.g., the HKEY does not represent a key in the portable registry), the intermediary reads the requested data from the system registry (e.g., calling one of original function addresses 302 of FIG. 3 using an appropriate HKEY for that original registry key). If the key is repeatedly read, the system registry may be read in addition to the portable registry.

In some cases, registry keys will need to be altered, such as to write a value. The intermediary may know which registry was previously read for the key by retaining a record of which HKEYs have been successfully read from the portable registry and which have not. When a function is then called that will make an alteration, the intermediary writes the key in the correct registry.

Figure 6:
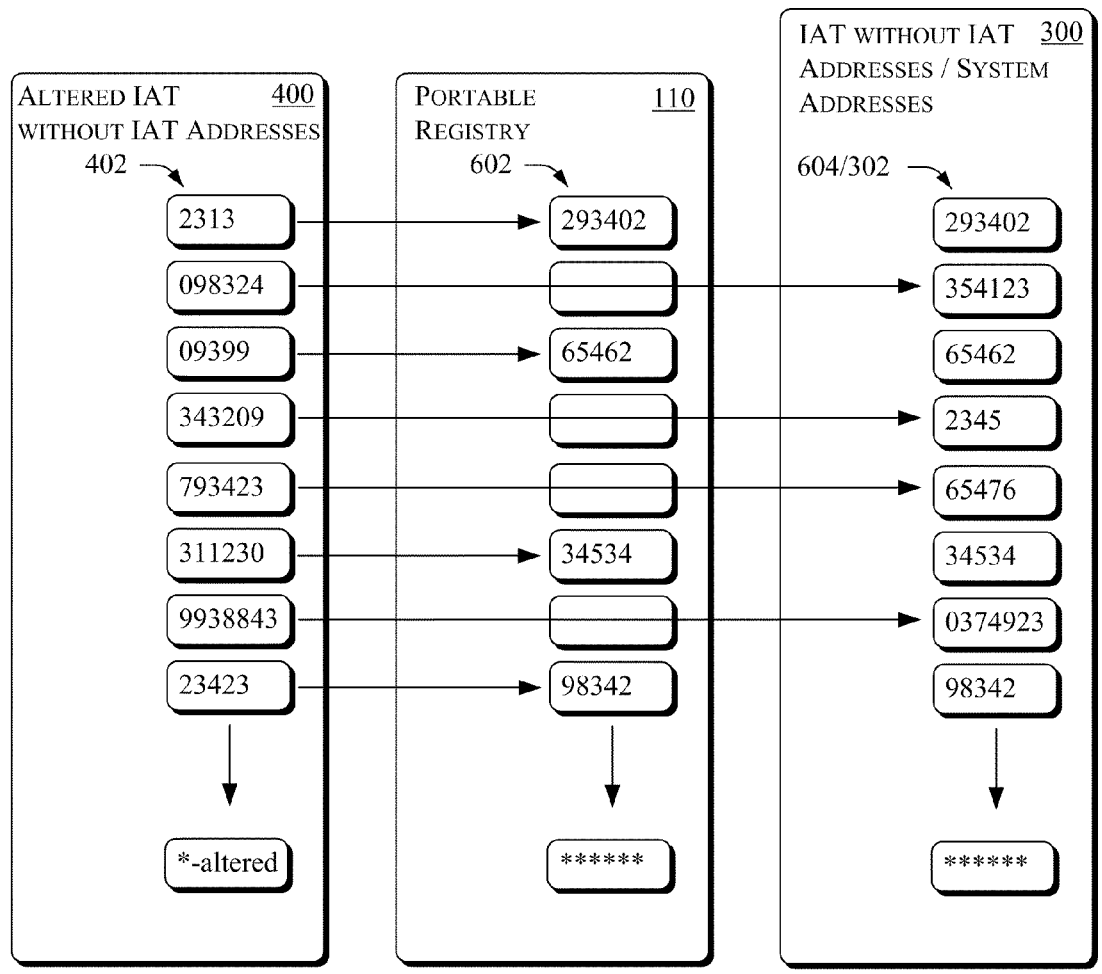
FIG. 6 illustrates a conjunction of an exemplary system registry and an exemplary portable registry.

Effectively, the conjunction of the system registry and the portable registry can be functionally similar or even identical to the result of installing a product to the system registry. Graphically this is shown, in simplified form, in FIG. 6. Here the altered addresses 402 of the altered IAT 400 are shown correlating to either a key 602 in the portable registry or an address 604 in the system registry API (which is the same as that of the original function addresses 302 of IAT 300). The sections of the portable registry without keys are shown blank. The correlation is shown between the original address and the portable or registries with arrows for clarity, though they may not line up in this fashion.

CONCLUSION

The above-described techniques enable an application to operate on a computing system as though it were installed on that computing system. These techniques may do so using a portable registry capable of supplementing or supplanting a computing system's registry. These techniques may provide significant improvements over the current state of the art, potentially enabling users to use their portable applications on computing systems without those portable applications behaving differently than they would had they been installed to those computing systems. Although these techniques have been described in language specific to structural features and/or methodological acts, it is to be understood that the techniques defined in the appended claims are not necessarily limited to the specific features or acts described. Rather, the specific features and acts are disclosed as exemplary forms of implementing the claimed techniques.

The invention claimed is:

1. One or more computer-readable memories storing computer-executable instructions that, when executed by one or more processors, configure the one or more processors to perform acts comprising:
    storing a portable database including metadata for a portable application on a portable storage device, the metadata included in the portable database being unavailable from a system database of system metadata on a computing device that accesses the portable storage device, each of the metadata and the system metadata affecting at least one functionality or at least one behavior of the portable application during execution by the computing device, wherein the portable database is accessed or loaded from the portable storage device, and the at least one functionality comprises a customization to the portable application enabled by the metadata in the portable database;
    executing the portable application stored on the portable storage device;
    intercepting a request for relevant metadata from the system database via an intermediary component;
    determining whether the relevant metadata exists in the portable database;
    reading the relevant metadata from the portable database using the intermediary component without reading the system metadata from the system database in response to determining that the relevant metadata exists in the portable database; and
    supplementing the portable database to create a combined database by reading the metadata from the portable database and the system metadata from the system database.

2. The one or more computer-readable memories of claim 1, wherein the request for relevant metadata is made by an entity associated with the application.

3. The one or more computer-readable memories of claim 1, wherein the request for relevant metadata includes a request to enumerate multiple values from a requested key.

4. The one or more computer-readable memories of claim 1, further comprising altering a table of addresses created by a program loader, the table of addresses originally comprising addresses for a system Application Programming Interface (API), the altering comprising prompting execution of a different function related to the portable application when the system API is called through the table of addresses.

5. The one or more computer-readable memories of claim 4, wherein reading the relevant metadata from the portable database comprises reading a key in the portable database having metadata associated with a functionality.

6. The one or more computer-readable memories of claim 4, further comprising reading additional metadata from the system database by calling the address originally on the table of addresses that is associated with the system API to read from the system database.

7. The one or more computer-readable memories of claim 1, further comprising:
    retaining a record of keys previously requested and from which the portable database or the system database the keys were previously read; and
    writing a key value alteration to a previously requested key in the portable database or the system database on behalf of a functionality of the portable application.

8. One or more computer-readable memories storing computer-executable instructions that, when executed by one or more processors, configure the one or more processors to perform acts comprising:
    storing a portable database having metadata pertaining to a portable application stored on a portable storage device, the metadata included in the portable database being unavailable from a system database of system metadata on a computing device linkable to the portable storage device;
    intercepting a request for relevant metadata from a system database to execute a function of the portable application using an intermediary component that is stored on the portable storage device as a part of the portable application, the intermediary component to intercept the request by mapping a first function address for calling the function to a second function address for calling the intermediary component that is stored on the portable storage device;

determining, by the intermediary component that is called using the second function address, whether at least one part of the relevant metadata exists in the portable database;

reading at least one part of the relevant metadata from the portable database and a second part of the relevant metadata from the system database using the intermediary component in response to the intermediary component determining that the at least one part of the relevant metadata exists in the portable database;

executing the function of the portable application based on the relevant metadata read from the portable database and the system database; and supplementing the portable database to create a combined database by reading the metadata from the portable database and the system metadata from the system database.

9. The one or more computer-readable memories of claim 8, wherein the relevant metadata affects at least one functionality or at least one behavior of the portable application during execution of the function by the computing device.

10. The one or more computer-readable memories of claim 8, wherein the metadata of the portable database comprises information for enabling a functionality particular to the portable application that is not enabled by additional metadata in the system database.

11. The one or more computer-readable memories of claim 10, wherein the functionality comprises a customization to the portable application made when the portable application was previously operating on a computing system comprising different processors.

12. The one or more computer-readable memories of claim 8, wherein the request for relevant metadata includes a request to enumerate multiple values from a requested key.

13. The one or more computer-readable memories of claim 8, wherein the function of the portable application comprises reading a value from the system database or writing a value to the system database.

14. A system comprising:
one or more processors;
a memory storing a system database of system metadata and a portable database having metadata pertaining to a portable application stored on a portable storage device, the metadata included in the portable database being unavailable from the system database of the system metadata, the portable storage device being linkable to the system, the memory further storing an intermediary component that is previously stored on the portable storage device as a part of the portable application, the intermediary component being executed by the one or more processor to:
intercept a request for relevant metadata from the portable database to enable execution of a function related to the portable application, the request being intercepted by a mapping of a first function address for calling the function to a second function address for calling the intermediary component;
determine whether at least one part of the relevant metadata exists in the portable database;
read at least one part of the relevant metadata from the portable database and read at least one additional part of the relevant metadata from the system database in response to the intermediary component determining that the at least one part of the relevant metadata exists in the portable database, such that the function of the portable application is executed based on the relevant metadata read from the portable database and the system database,
wherein reading of the relevant metadata from the portable database and the system database supplements the portable database and creates a combined database.

15. The system of claim 14, wherein the relevant metadata affects at least one functionality or at least one behavior of the portable application during the execution of the function.

16. The system of claim 14, wherein the request for relevant metadata is made by an entity associated with the application.

17. The system of claim 14, wherein the request for relevant metadata includes a request to enumerate multiple values from a requested key.

18. The system of claim 14, wherein the intermediary component is to read the at least one part of the relevant metadata from the portable database by reading a key in the portable database having metadata associated with a functionality.

19. The system of claim 14, wherein the intermediary component is to read at least one additional part of the relevant metadata from the system database by calling the address originally on the table of addresses that is associated with the system API to read from the system database.

20. The system of claim 14, wherein the function comprises a customization to the portable application made when the portable application was previously operating on a computing system comprising one or more different processors.

* * * * *